C. B. McDONALD.
CAN TESTING MACHINE.
APPLICATION FILED JUNE 1, 1908.
938,165.
Patented Oct. 26, 1909.
5 SHEETS—SHEET 3.
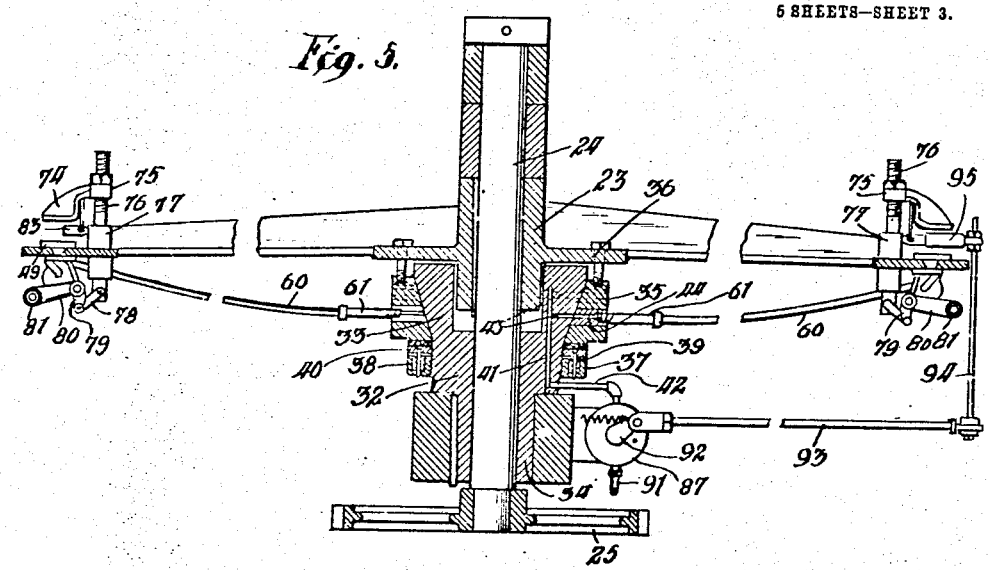
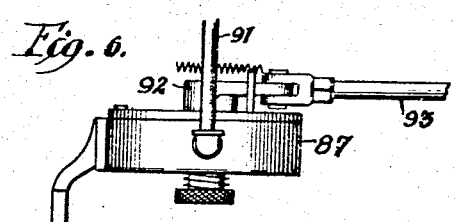
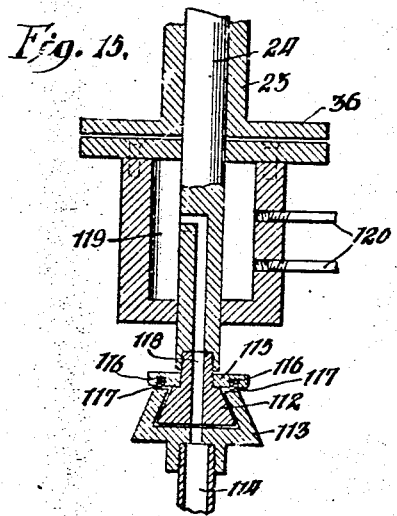
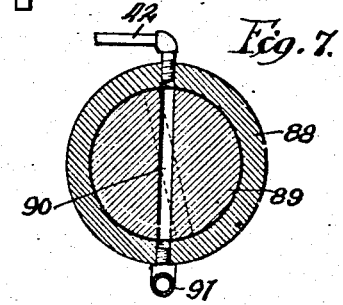
Witnesses:
Inventor:
Charles B. McDonald
by
Banning & Banning
Attys.

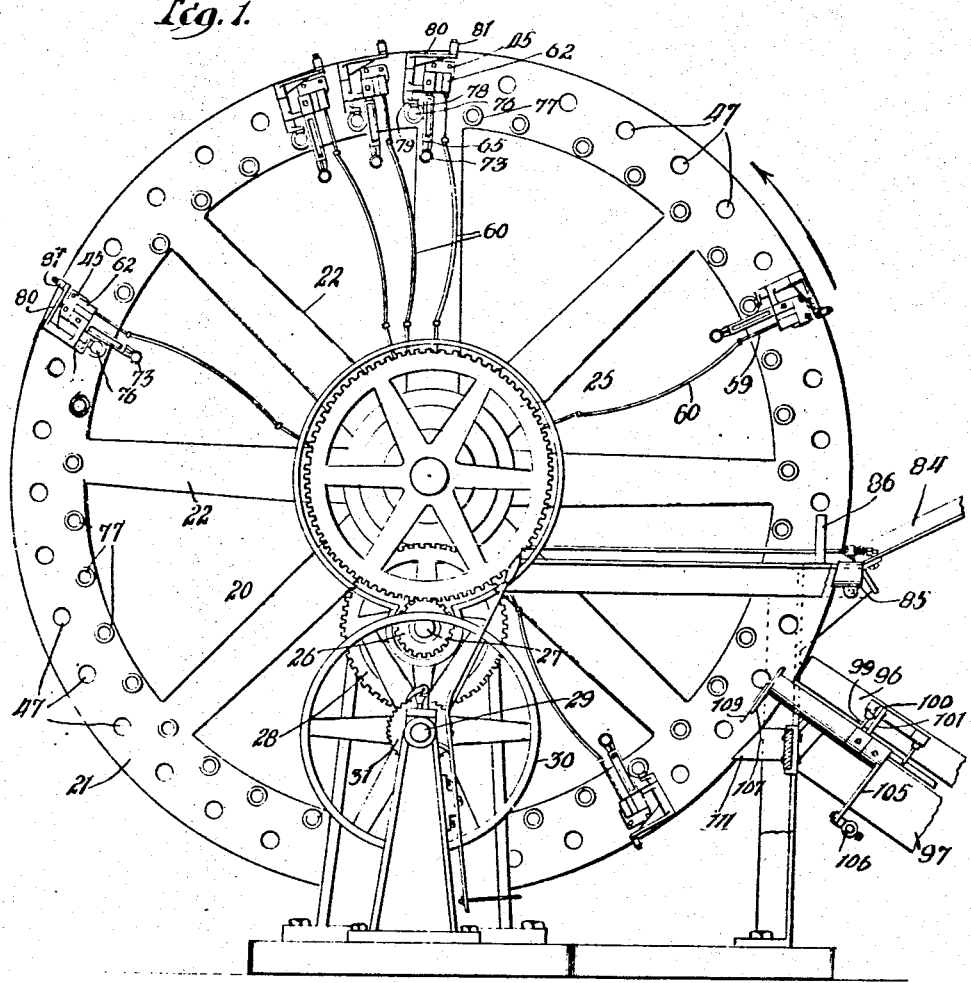

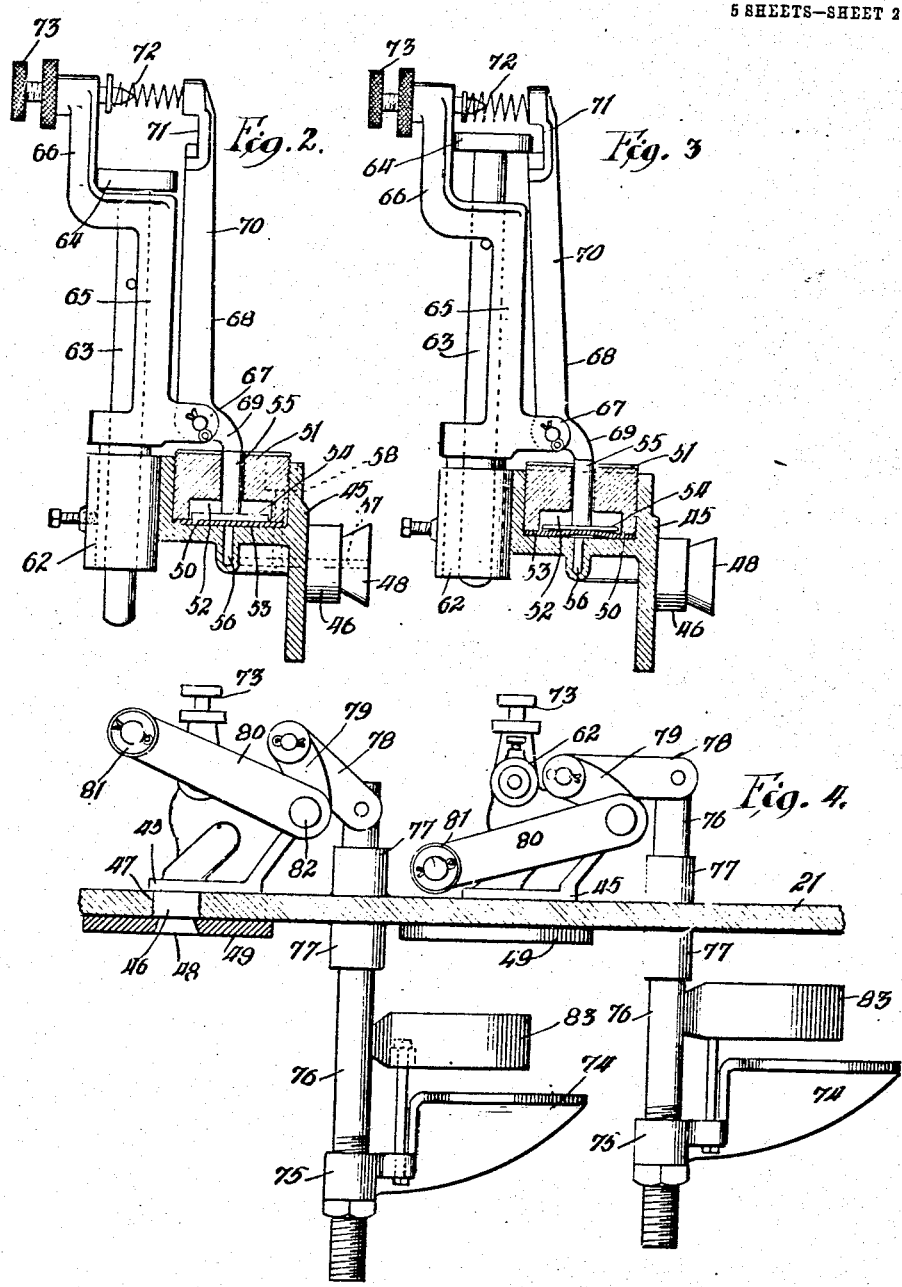

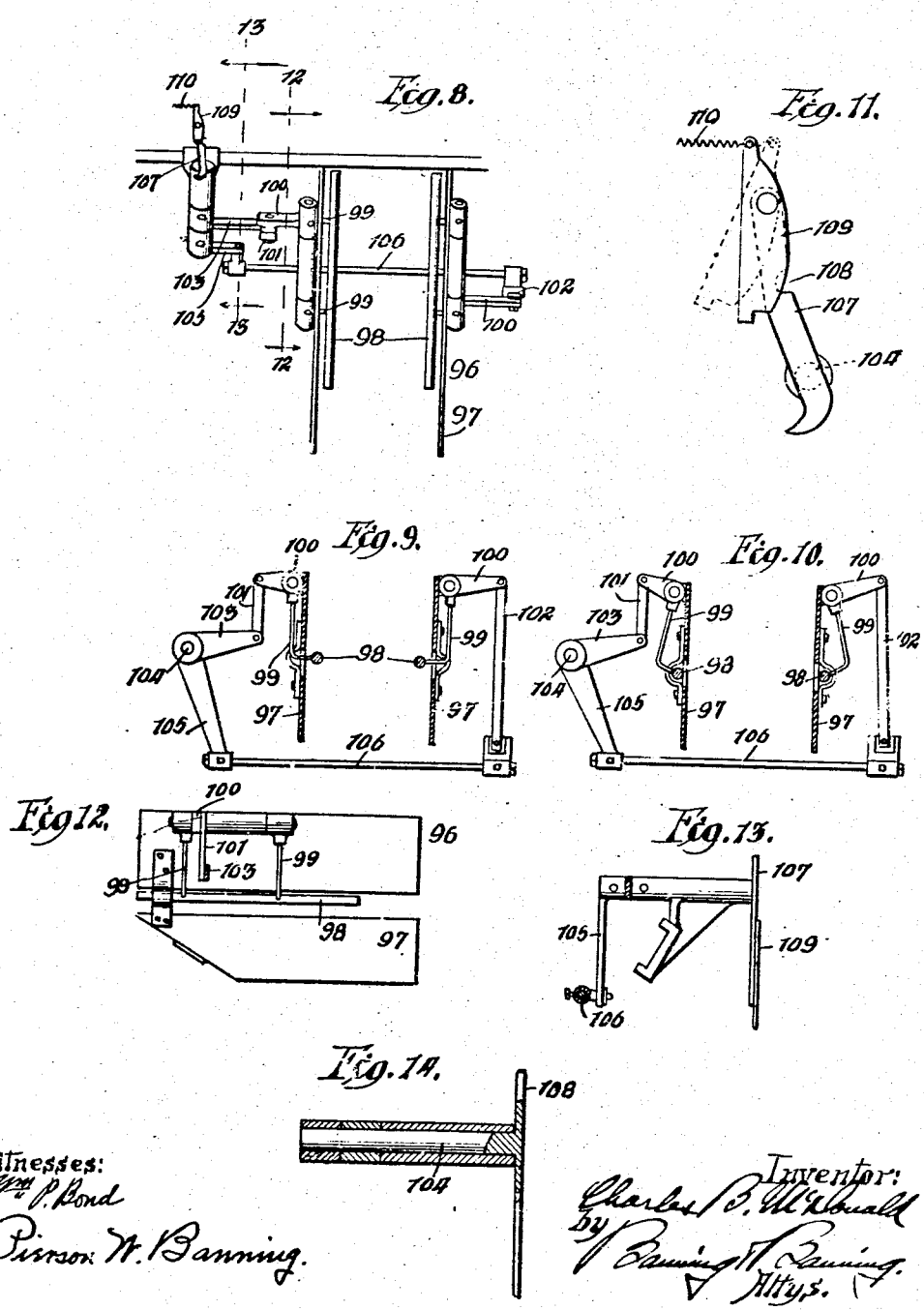

C. B. McDONALD.
CAN TESTING MACHINE.
APPLICATION FILED JUNE 1, 1908.
938,165.
Patented Oct. 26, 1909.
5 SHEETS—SHEET 5.
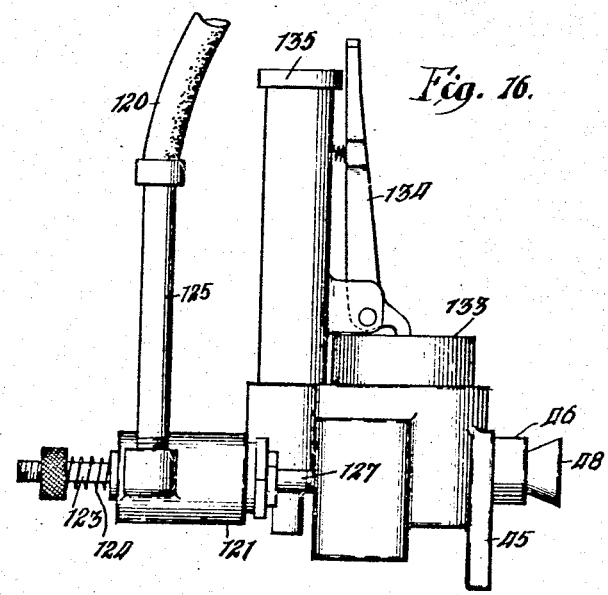
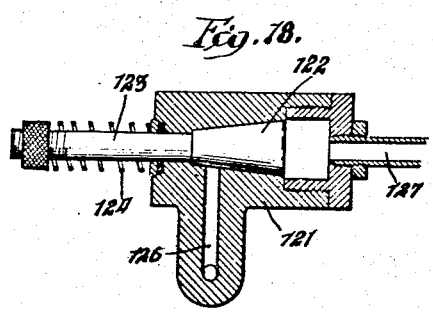
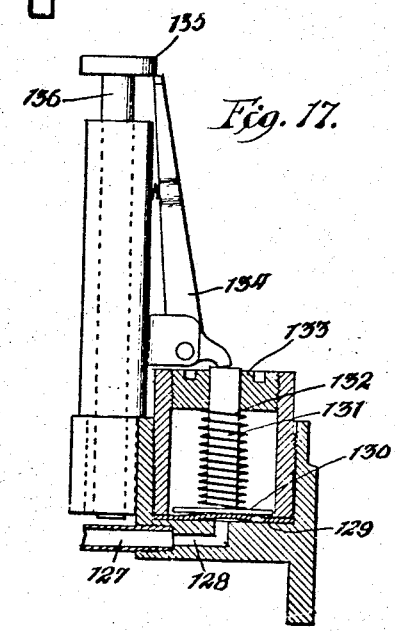
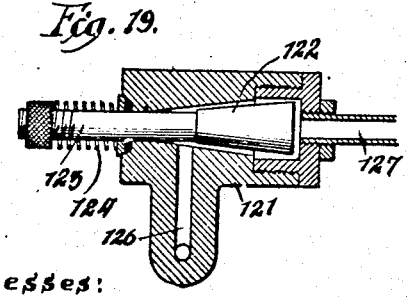
Witnesses:
Wm P. Bond
Pirson W. Banning
Inventor:
Charles B. McDonald
by Banning & Banning
Attys.

UNITED STATES PATENT OFFICE.

CHARLES B. McDONALD, OF CHICAGO, ILLINOIS, ASSIGNOR TO McDONALD MACHINE COMPANY, OF CHICAGO, ILLINOIS, A CORPORATION OF ILLINOIS.

CAN-TESTING MACHINE.

938,165.   Specification of Letters Patent.   Patented Oct. 26, 1909.

Application filed June 1, 1908. Serial No. 436,009.

*To all whom it may concern:*

Be it known that I, CHARLES B. McDONALD, a citizen of the United States, residing at Chicago, in the county of Cook and State of Illinois, have invented certain new and useful Improvements in Can-Testing Machines, of which the following is a specification.

The machine of the present invention is intended to test cans for the discovery therein of leaks; and the object of the invention is to so construct the machine that it will be extremely compact in form and at the same time possess very high capacity and extreme perfection in detecting leaks of even the minutest character. The machine is intended to perform the testing pneumatically, without the necessity for immersion of the cans in a water tank and to deliver the perfect cans at the intended point and throw out imperfect cans at a different point, so that after the cans are passed through the machine all of the imperfect cans will be thrown out and eliminated.

The invention relates more particularly to the means provided for automatically clamping and unclamping the cans, to the pressure actuated mechanism for detecting imperfect cans by a decrease of the pressure admitted thereto, to the lever mechanism provided for magnifying the movement of the pneumatic diaphragm in order to detect the leaks of minute character, to the trip and can mechanism for throwing out leaky cans, to the hub mechanism for distributing pressure to the various sealing heads, and to the mechanism actuated by the detecting mechanism for dropping leaky cans at the point of discharge. The machine is so constructed that the cans will remain under pressure for a sufficient length of time to insure the detection of extremely small leaks; and the detecting mechanism is so arranged that a minute deflection from normal conditions will be sufficiently magnified to operate the trip mechanism whereby leaks of a character which frequently escape detection when tested under usual conditions will be eliminated by the machine of the present invention.

The invention consists in the features of construction and combination of parts hereinafter described and claimed.

In the drawings, Figure 1 is a side elevation of the entire machine, showing several of the testing heads, the positions of the remaining heads being indicated; Fig. 2 a view, partly in section, of the diaphragm and trip mechanism in position to throw out a defective can; Fig. 3 a similar view, showing the trip mechanism actuated by a normal pressure in a perfect can; Fig. 4 a view showing two of the sealing heads and a portion of the rim of the wheel in section; Fig. 5 a view partly in section, showing the bearing cone and pressure passages co-acting therewith; Fig. 6 a detail of the valve actuating mechanism for maintaining the intended pressure within the cone; Fig. 7 a sectional detail of the same; Fig. 8 a plan view of the discharge chute, showing the mechanism for throwing out defective cans; Fig. 9 a sectional elevation of the same in position to deliver a perfect can; Fig. 10 a similar view showing the parts in position to discharge an imperfect can; Fig. 11 a detail of the lever mechanism for actuating the chute mechanism; Fig. 12 a sectional view taken on line 12—12 of Fig. 8; Fig. 13 a sectional view taken on line 13—13 of Fig. 8; Fig. 14 a detail partly in section, showing the rock shaft and lever of Fig. 11; Fig. 15 a sectional view of a modified form of air distributing chamber in the bearing of the wheel; Fig. 16 a side elevation of a modified form of sealing head adapted for use in connection with the bearing mechanism of Fig. 15; Fig. 17 a detail partly in section of the same, showing the trip mechanism actuated by normal pressure in a perfect can; Fig. 18 a sectional detail of the pressure controlling valve of Fig. 16 open; and Fig. 19 a similar view showing the valve closed.

Referring to Fig. 1, the machine as a whole is in the form of a wheel 20 having a rim 21 connected by spokes 22 with a hub 23. The hub is keyed or otherwise secured to a shaft 24 having on its end a gear wheel 25 meshing with a pinion 26 which is located upon a stub shaft 27. The stub shaft carries a gear wheel 28 which meshes with a pinion, not shown, on a power shaft 29 actuated by means of a pulley 30 through the medium of a clutch 31. The main shaft 24 is journaled within a bearing block 32, the inner end of which is in the form of a truncated cone and the forward end of which terminates in a sleeve 34 of reduced diameter. The tapered or cone-shaped portion of the bearing block is surrounded by a collar 35 which is bolted or otherwise secured to a flange 36 outwardly projecting from the hub 23 so that the collar revolves with the hub around the cone-shaped portion of the bearing block as a bearing. The collar 35 is held in close engagement with the cone by means of a ring nut 37 which is screwed onto the body of the bearing block, and is provided at suitable intervals with counterbored recesses 38 having therein springs 39 which serve to compress a washer 40 which bears against the collar 35 and holds the same in close engagement with the surface of the cone, meanwhile allowing the ring to revolve with the hub of the wheel. The bearing block has bored therein a main air passage 41 which connects at its outer end with an air supply passage 42, and the main air supply passage has leading therefrom two air ports 43, one of which is shown in dotted lines, which ports are arranged in diagonal relation to one another, one of the ports being located forwardly of the other. The air ports 43 are adapted to register with air passages 44 bored in the collar 35, which air passages are arranged in two rings and positioned to register with the inner and outer ports 43, so that as the collar is revolved the air passages therein will be momentarily brought into register with the supply ports for receiving a charge of compressed air therefrom, it being understood that a separate air passage is provided for each of the heads on the tester. The heads, in the preferred form shown in Figs. 2 and 3, are intended to admit a predetermined degree of pressure to each of the cans fed to the machine and operate in connection with clamping means for holding the cans in position.

Referring to Figs. 2, 3, and 4, each of the heads comprises a frame 45 provided, on one side, with a cylindrical boss 46 which is entered through a hole 47 in the rim of the wheel, and the boss is provided, on its forward face, with an inwardly beveled head 48 which is adapted to receive a rubber sealing disk 49 against which the open end of the can is intended to be clamped. The frame is further provided, on its opposite side, with a cylindrical bore 50 which receives a plug 51 chambered out on its inner face 52 to provide a diaphragm chamber within which is located a flexible diaphragm 53 backed by a piston 54 having a stem 55 which outwardly projects from the plug 51. The diaphragm overlies an air port 56 which communicates with a passage 57 opening through the face of the head 48 and into the open mouth of the can. The passage 57 is in open communication with a passage 58 into which is entered a pipe 59 connected with a rubber hose 60, which hose, at its inner end, connects with a pipe 61 entered into the collar 35 and in communication with one of the ports therein. It will thus appear that air admitted through the collar will simultaneously enter the open mouth of the can and act against the flexible diaphragm, as shown in Fig. 3.

The frame further comprises a sleeve 62 in parallel relation with and outside of the chambered plug 51, which sleeve has entered therethrough a trip rod 63 provided with an enlarged head 64, the rod being passed through a bracket 65 terminating, at its rear end, in an offset arm 66 laterally adjacent the head 64. The bracket is further provided with ears 67 between which is pivoted an L lever 68, the short arm 69 of which rests against the end of the stem 55, and the long arm 70 of which is provided, near its outer end, with a notch 71 which is adapted to engage the head 64 when the L lever is thrown into the position shown in Fig. 3. The lever is held in normal position by the action of a spring 72 which bears against the end of the long arm and is adapted to be regulated by means of a thumb screw 73. When the diaphragm is raised by a normal pressure admitted to a perfect can, the L lever will be thrown into the position shown in Fig. 3, in which position it will engage the head of the trip rod and hold the end thereof retracted. Furthermore, a very slight movement of the piston stem 55 will be proportionately magnified or exaggerated by the construction and arrangement of the L lever, so that the movements of the piston stem, which it would be practically impossible to detect, will be sufficiently magnified to actuate the trip mechanism.

The sealing disk 49 coöperates with a clamping head 74 which is carried by an arm 75 slidably mounted upon a rod 76 entered through a bushing 77 on the rim of the wheel, and the rear end of the rod has pivoted thereto a link 78 which in turn is pivoted to the short arm 79 of a clamping lever 80, the long arm of which is provided, on its free end, with a roller 81, the lever being pivoted to the frame by means of a pivot pin 82 located at the elbow of the lever. As shown in Fig. 4, the position occupied by the can is considerably in advance of the free end of the clamping lever, the clamping mechanism for one can being pivoted to the frame containing the testing mechanism for the next succeeding can. Between the clamping head 74 and the disk 49 is located a shelf 83 upon which the body of the can is adapted to rest prior to the movement of the clamping head.

The cans are fed to the tester through a chute 84 adjacent which is a bevel cam 85 under which the wheel 81 is intended to ride, which moves the clamping lever from the position shown to the left of Fig. 4 to the position shown to the right of said figure; and, in view of the fact that the clamping lever is positioned to the rear of the can acted upon, the clamping operation will not take place until the can has rolled from the chute 84 onto the shelf 83 between the clamping members. Immediately thereafter the movement of the wheel will bring the air supply port in the collar 35 into position to receive a charge of air from one of the ports 43, and the air so admitted will simultaneously enter the can and act upon the diaphragm. When the can has received a charge of compressed air the L lever 68 will be thrown into the position shown in Fig. 3, and immediately thereafter the projecting end of the trip rod 63 will ride against a cam 86 which inwardly projects the trip rod into position to engage the notch in the L lever. It will, of course, be understood that until a can is in position to receive a charge of compressed air the trip rod will be dropped into the position shown in Fig. 2, which is also the position occupied by said rod when the pressure is decreased by leakage from an imperfect can.

In order to compensate for the pressure admitted into a can, a valve 87 is provided comprising a casing 88 and a valve plug 89. The plug is provided with a bore 90 which, when closed, occupies the position shown in dotted lines. Pressure is admitted to the valve through a pipe 91 on one side of the casing, and supplied from the valve through the pipe 42. The valve plug is provided with a crank arm 92 which is connected with a rod 93 connecting with a rock shaft 94, which rock shaft extends in transverse relation outside of the periphery of the wheel; and is provided, near its end, with a finger 95 which occupies a position intermediate the clamping head and the sealing disk, so that every time a can is carried past the finger 95 the latter will be raised to rock the shaft 94 and actuate the valve for the admission of pressure to compensate for the pressure admitted to the can. When, however, an empty clamping head passes the finger the latter will not be actuated.

Immediately below the feed chute 84 is a discharge chute 96, best illustrated in Figs. 8, 9, and 10, which chute comprises side walls 97, intermediate which are located movable track rails 98 in the form of rods which are connected with L-shaped brackets 99 depending from pivoted bell crank levers 100 on opposite sides of the chute. The bell crank levers are adapted to be simultaneously actuated by means of links 101 and 102, respectively. The link 101, which is a short link, connects with a lever arm 103 carried by a stub rock shaft 104, which shaft further carries an arm 105 set in substantially parallel relation with the walls of the chute, which arm is connected with the link 102 by means of a rod 106, so that a movement of the rock shaft 104 will simultaneously throw the bell crank levers 100 from the position shown in Fig. 9 to the position shown in Fig. 10, thereby retracting the guide rails 98, so that the latter will allow a can discharged thereon to drop between said guide rails into any suitable receptacle provided for discarded cans. The rock shaft 104 is provided, on its end, with a trip finger 107 provided with a notch 108, which notch is protected by a pivoted guard 109 which normally occupies the position shown in full lines in Fig. 11, and is adapted to be thrown into the position shown in dotted lines against the tension of a spring 110 connected to any convenient portion of the frame. The notched trip finger and guard plate extend in edgewise relation with respect to the rim of the wheel and occupy a position such that if the end of the trip rod be outwardly projected to indicate an imperfect can said projecting end will pass under the inner edge of the pivoted guard 109 and along the inner edge of the trip finger, engaging the notch 108 in the latter and swinging the trip finger out of its normal position; and this movement of the trip finger will throw the guide rails from the position occupied in Fig. 9 into the position shown in Fig. 10, allowing the can discharged from the wheel to fall through the chute and be discarded.

In order to release the can, a cam 111 is provided at a suitable position below the trip finger, over which cam the wheel on the clamping lever is adapted to ride, so that when the cam is raised to the mouth of the discharge chute it will be unclamped and roll off the ledge upon which it rests. If, however, the can be perfect, the trip rod will be held in retracted position and its end will ride over the inner face of the guard plate and the trip finger and not under the inner edges thereof, so that the guide rails in the chute will remain in projected position to carry the delivered can over the position of discharge for discards.

In the modifications shown in Figs. 15 to 19, inclusive, the compressed air is admitted into the end of the main shaft through an outwardly divergent cone-shaped nipple 112 which is screwed into the end of the shaft and is surrounded by a casing 113 into which the end of a pressure supply pipe 114 is entered. A ring 115 is screwed onto the nipple and provided with counterbores 116 having located therein springs 117 which bear against the inner edge of the casing 113 to hold the walls of the latter in close impingement against the walls of the nipple. A passage 118 is provided leading through the nipple and the shaft and communicating with a cylindrical casing 119 which has entered thereinto supply pipes 120, one for each of the testers. Each of the testers comprises a casing 121 having entered therein a valve 122 which is provided with a stem 123 surrounded by a coil spring 124. The hose 120 connects with a section of pipe 125 which communicates with a passage 126 leading through the valve casing, the inlet from which passage is controlled by the valve 122. The casing is provided with an outlet pipe 127 which communicates with a passage 128 opening under a flexible diaphragm 129 which is compressed by a piston 130 having a stem 131 surrounded by a coil spring 132. The stem of the piston projects through a plug 133 and engages the end of an L lever 134, which end is adapted to engage the head 135 of a trip rod 136 similar in arrangement and function to the trip rod previously described. The action of the modified form of tester is similar to that previously described, except that each of the valves 122 will receive an inward thrust from a cam suitably positioned to actuate said valves immediately after the clamping of the cans, which inward thrust will admit pressure through the pipe 127 to the diaphragm and to the can, the passages leading to the can being similar to those previously described. The L lever 134 is actuated in the manner previously described, except that the spring for holding the diaphragm against pressure is coiled around the stem of the piston instead of bearing against the end of the L lever. In respect to the method of clamping and discharging the cans and the method of actuating the discharge chute to throw out discards, the mechanism is the same as that previously described.

The operation of the machine will be generally understood from the foregoing description, but may be briefly summarized as follows: The cans are rolled down the chute 84 and each of the testers receives a can between the clamping head and the sealing disk, which can rests upon the shelf provided therefor. Immediately after the can is positioned, the clamping head will be moved toward the sealing disk by the action of the cam 84 under which the wheel 81 travels. The can being thus clamped in position will receive its charge of compressed air, the pressure of which will act against the diaphragm and throw the L lever into position to engage the head of the trip rod and hold it during the revolution of the wheel. By reason of the size of the wheel and its relatively slow speed of revolution, the can thus filled with compressed air will be clamped for a sufficient length of time to fully subject it to the required test. If during any portion of the revolution of the wheel the pressure within the can and the pressure upon the diaphragm should be reduced by leakage, the action of the spring against the L lever would throw back said lever and release the head of the trip rod, thereby allowing the latter to fall by gravity when it reached a lower position in its orbit of travel, so that the end of the rod would project into position to engage the notched trip finger and throw back the guide rails in the discharge chute, thereby allowing the leaky can to be discarded. On the other hand, if the can were free from leaks, the pressure would be maintained at all points during the travel of the can through the tester, so that when discharged the can would roll over the guide rails of the discharge chute.

In view of the fact that, as constructed, the movement of the piston stem acting against the short arm of the L lever will be magnified 64 times in the long arm of the lever, it is evident that an extremely minute diminution in the degree of pressure acting against the diaphragm will be sufficient to release the head of the trip rod, so that cans having leaks so minute as to escape detection by ordinary testing methods will be invariably thrown out by the machine of the present invention. The arrangement is one which provides extreme compactness and high capacity in view of the fact that the narrow form of the machine is one which enables it to be located within a very small space and to be operated by the expenditure of a small amount of power.

What I regard as new and desire to secure by Letters Patent is:

1. In a can testing machine, the combination of mechanism for clamping a can, mechanism adapted to be actuated by variations of pressure within the can, an L lever having its short arm in engagement with the pressure actuated means, trip mechanism adapted to be engaged by the long arm of the lever when the pressure within the can is normal and adapted to be released from engagement when the pressure falls below normal, and mechanism adapted to be actuated by the trip mechanism for discharging perfect and imperfect cans at selected points, substantially as described.

2. In a can testing machine, the combination of clamping mechanism for holding the cans, and having a passage communicating with the interior of a clamped can, a piston adapted to be moved by the admission of fluid under pressure to the can, a lever pivoted off center and having its short arm in engagement with said piston, a trip rod provided with a head adapted to be engaged by the long arm of the lever when pressure is maintained within the can and adapted to be released from engagement when pressure is reduced within the can by leakage, the trip rod being projected when released and retracted when engaged, and means actuated by the projecting end of the rod for discarding imperfect cans, substantially as described.

3. In a can testing machine, the combination of clamping mechanism for holding the cans, and having a passage communicating with the interior of a clamped can, a piston adapted to be moved by the admission of fluid under pressure to the can, a lever pivoted off center and having its short arm in engagement with said piston, a trip rod provided with a head adapted to be engaged by the long arm of the lever when pressure is maintained within the can and adapted to be released from engagement when pressure is reduced within the can by leakage, the trip rod adapted to be projected when released and retracted when engaged, a cam for retracting the trip rod a chute provided with means for separating perfect and imperfect cans, and mechanism adapted to be engaged by the trip rod when projected for actuating said means, substantially as described.

4. In a can testing machine, the combination of clamping mechanism for holding the cans, and having a passage communicating with the interior of a clamped can, a diaphragm adapted to be moved by the admission of fluid under pressure to the can, an L lever having its short arm in engagement with said piston, a trip rod provided with a head adapted to be engaged by the long arm of the lever when pressure is maintained within the can and adapted to be released from engagement when pressure is reduced within the can from leakage, the trip rod being projected when released and retracted when engaged, a discharge chute provided with guide rails adapted to deliver perfect cans and adapted to be retracted to drop imperfect cans, and mechanism adapted to be engaged by the trip rod when projected for retracting the guide rails, substantially as described.

5. In a can testing machine, the combination of a wheel provided with a plurality of testers, each of the testers comprising a slidably mounted clamping head, a sealing head, a diaphragm closing a passage in communication with the sealing head, a piston engaging the diaphragm and provided with a stem, an L lever having its short arm in engagement with the stem, a slidably mounted trip rod provided with a head adapted to be engaged by the long arm of the L lever when thrown from normal position by the action of pressure on the diaphragm, and adapted when released to allow the projection of the trip rod, and mechanism actuated by the trip rod, when projected, for delivering imperfect cans at a predetermined point, substantially as described.

6. In a can testing machine, the combination of a wheel provided with a plurality of testers, each of the testers comprising a slidably mounted clamping head, a sealing head, a diaphragm closing a passage in communication with the sealing head, a piston engaging the diaphragm and provided with a stem, an L lever having its short arm in engagement with the stem, a slidably mounted trip rod provided with a head adapted to be engaged by the long arm of the L lever when thrown from normal position by the action of pressure on the diaphragm, and adapted when released to allow the projection of the trip rod, a chute provided with a runway for delivering perfect cans, and mechanism actuated by the projection of the trip rod for retracting said runway to allow the dropping of imperfect cans, substantially as described.

7. In a can testing machine, the combination of a wheel provided with a plurality of sealing heads adapted to receive and pneumatically seal the cans supplied thereto and provided with air passages for admitting compressed air to the interior of the cans, means adapted to be moved upon decrease of pressure due to leakage, trip mechanism actuated by such means, a discharge chute provided with runways adapted to deliver cans of one class, and means actuated by the trip mechanism for displacing the runways to drop cans of another class, substantially as described.

8. In a can testing machine, a wheel provided with a plurality of sealing heads adapted to receive and pneumatically seal the cans supplied thereto, and provided with air passages for admitting compressed air to the interior of the sealed cans, mechanism actuated by variations of the pressure in the cans, a trip rod in engagement with said pressure actuated mechanism and adapted to be held retracted thereby when the pressure mechanism is subjected to a given pressure, and adapted to be released therefrom and moved to projecting position when the pressure mechanism is subjected to a different pressure, a discharge chute provided with a runway adapted to deliver cans of the selected character, and mechanism adapted to be actuated by the trip rod when projected for displacing said runway to drop cans of a different character, substantially as described.

CHARLES B. McDONALD.

Witnesses:
WALKER BANNING,
FRANCES M. FROST.